United States Patent
Shevchenko et al.

(10) Patent No.: US 6,440,327 B1
(45) Date of Patent: Aug. 27, 2002

(54) POLYMERS AND USE THEREOF AS SCALE INHIBITORS

(75) Inventors: Sergey M. Shevchenko, Lisle; Prasad Y. Duggirala, Naperville, both of IL (US)

(73) Assignee: Ondeo Nalco Company, Naperville, IL (US)

(*) Notice: Subject to any disclaimer, the term of this patent is extended or adjusted under 35 U.S.C. 154(b) by 65 days.

(21) Appl. No.: 09/774,413

(22) Filed: Jan. 31, 2001

(51) Int. Cl.$^7$ .................................................. C02F 5/02
(52) U.S. Cl. ...................... 252/175; 562/409; 562/410; 562/411; 562/412; 562/419
(58) Field of Search .................. 562/409, 410, 562/411, 412, 419; 252/175

(56) References Cited

U.S. PATENT DOCUMENTS

| | | | |
|---|---|---|---|
| 4,683,298 A | * 7/1987 | Yalpani | ..................... 536/18.7 |
| 4,872,995 A | 10/1989 | Chen et al. | |
| 5,256,253 A | 10/1993 | Zidovec et al. | |
| 5,320,757 A | 6/1994 | Zidovec et al. | |

FOREIGN PATENT DOCUMENTS

| | | |
|---|---|---|
| CA | 1326430 | 1/1994 |
| EP | 0 517 453 A1 | 12/1992 |

OTHER PUBLICATIONS

A. Isogai, and Y. Kato, Preparation of polyuronic acid from cellulose by TEMPO–mediated oxidation, Cellulose, 1998, 5, 153–164.

N. J. Davis, and S.L. Flitsch, Selective oxidation of monosaccharide derivatives to uronic acids, Tetrahedron Letters, vol. 34, No. 7, 1993, 34, 1181–1184.

O.L. Crees, C. Cuff, W.O.S. Doherty, and E. Senogles, The affects of polymeric additives on the crystallization of compounds present in evaporator scales, Proceedings of Australian Society Sugar Cane Technologists, 1993, 15, 141–149.

J.D. Sallis, N.F.G. Parry, J.D. Meehan, H. Kamperman, and M.E. Anderson, Controlling influence of phosphocitrate in vitro and in vivo on calcium oxalate crystal formation and growth, Scanning Microscopy, 1995, 9, 127–136.

W.O.S. Doherty, O.L. Crees, and E. Senogles, Polymeric Additives' Effect On Crystallization of Calcium Oxalate Scales, Cryst. Res. Technol., vol. 30, 1995, 791–800.

* cited by examiner

Primary Examiner—Samuel A. Acquah
(74) Attorney, Agent, or Firm—Margaret M. Brumm; Thomas M. Breininger

(57) ABSTRACT

Compositions and methods for inhibiting scale are provided. Pursuant to the present invention, a composition for inhibiting scale is provided that includes a carbohydrate polymer having both nitrogen-containing groups and carboxyl groups. The nitrogen-containing groups include amino groups, amido groups and mixtures thereof. The present invention has been found useful for inhibiting scale in industrial waters, such as, pulp bleach plant process waters which contain calcium oxalate and barium sulfate scale.

20 Claims, No Drawings

POLYMERS AND USE THEREOF AS SCALE INHIBITORS

FIELD OF THE INVENTION

This invention is in the field of polymers used for scale inhibition in industrial water systems. Specifically this invention claims certain polymers and a method of using the polymers as a scale inhibitor in industrial water systems.

BACKGROUND OF THE INVENTION

Calcium oxalate and barium sulfate scale is a persistent problem in pulp bleaching. Calcium oxalate scale is also a commonly known problem in de-inking and sugar processes and has a significant medical and biological importance.

In the pulp bleaching process, the undesirable scale generally deposits on the internal surfaces of the equipment. The scale deposits can inhibit the bleach plant process by, for example, plugging the equipment, such as, the screens, reactors, and internal passages. Chemical deposit control agents are generally known and used to alleviate the scaling problem. These agents act according to three fundamental control mechanisms, that is, inhibition, dispersion, and crystal modification.

Commercially available scale control or anti-scaling agents are typically developed to target a specific type of scale. For example, polymeric organic acids can inhibit calcium oxalate scale formation; polyacrylates can inhibit certain types of scale, not including barium sulfate; polysulfonic acids or polyphosphates can inhibit barium sulfate; and chitin and chitosan can effectively absorb metal cations.

An organic polymer based on polyepoxy succinic acid is also known to inhibit barium sulfate. However, this product is not readily biodegradable, is toxic, and is expensive to manufacture. It is also known that carbohydrates, in general, are not effective inhibitors of calcium oxalate and barium sulfate.

Accordingly, there exists a continuing need to develop an improved scale inhibiting agent, in particular an agent that targets both calcium oxalate and barium sulfate scale which are problems to industrial water systems.

SUMMARY OF THE INVENTION

The first aspect of the invention are polymers comprising: repeating mer units of the formula:

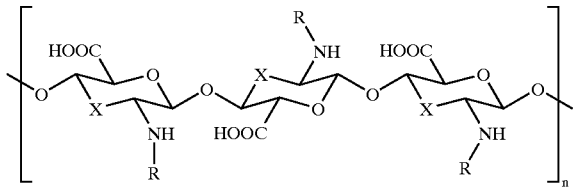

where X is selected from the group consisting of CO, C(H)OH, and mixtures thereof; R is selected from the group consisting of H, alkyl groups, acyl groups and mixtures thereof; and n is an integer from 1 to 400,000.

The second aspect of the invention is a method of producing a polymer, the method comprising the steps of:
providing a base polymer;
oxidizing the base polymer in a solution containing an oxidizing agent; and
recovering a polymer comprising repeating mer units of the formula:

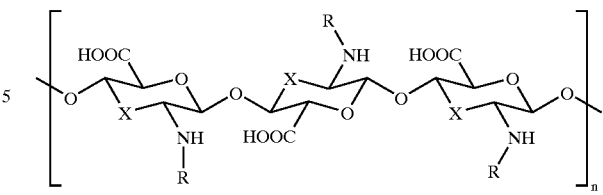

where X is selected from the group consisting of CO, C(H)OH, and mixtures thereof; R is selected from the group consisting of H, alkyl groups, acyl groups, and mixtures thereof; and n is an integer from 1 to 400,000.

The third aspect of the invention is method for inhibiting scale formation in an industrial water system containing an amount of scale-forming moieties, the method comprising the steps of:
providing an industrial water system;
providing a polymer comprising repeating mer units of the formula:

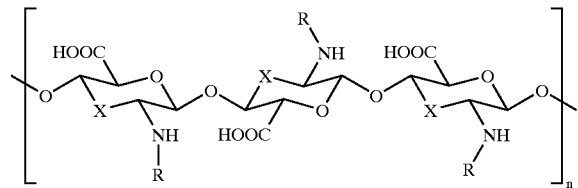

where X is selected from the group consisting of CO, C(H)OH, and mixtures thereof; R is selected from the group consisting of H, alkyl groups, acyl groups and mixtures thereof; and n is an integer from 1 to 400,000;
adding an effective amount of said polymer to said industrial water system.

DETAILED DESCRIPTION OF THE INVENTION

For purposes of this patent application the following terms have the indicated meanings:

"Aldrich" refers to Aldrich Chemical Company, P.O. Box 2060, Milwaukee, Wis., 53201 U.S.A. telephone number (800) 558-9160, fax number (800) 962-9591.

"Nalco" refers to Nalco Chemical Company, One Nalco Center, Naperville, Ill. 60563, (630) 305-1000.

"polymer" refers to a macromolecule formed by the chemical union of five or more identical combining units called monomers. Monomers can be abbreviated as "mer" or "mer units".

The present invention provides new polymers and methods of using these new polymers for inhibiting scale, specifically, for inhibiting calcium oxalate and barium sulfate scale. The present invention includes a polymer having a number of nitrogen-containing groups and carboxyl groups. It has been found that the combined functional properties of the nitrogen-containing groups and the carboxyl groups of the present invention demonstrate desirable and advantageous scale inhibiting properties, particularly in relation to calcium oxalate and barium sulfate scale, as detailed below. Scale deposition is problematic to industrial water systems in general and in particular to industrial water systems related to the paper industry, such as, pulp bleaching, as previously discussed.

In general, the polymers of the instant claimed invention include a carbohydrate polymer having both nitrogen-containing groups and carboxyl groups, particularly from the class of carbohydrate polymers including polyaminouronic acids and polyacetamidouronic acids. This class of carbohydrates includes uronic acids having a number of nitrogen-containing groups, such as, amine groups, amide groups and mixtures thereof as described below. Uronic acids are essentially carbohydrates with carboxyl groups. In general, uronic acids are formed when a carbohydrate terminal group, such as, $CH_2OH$, is oxidized.

In the first aspect of the instant claimed invention the polymers comprise repeating mer units of the formula:

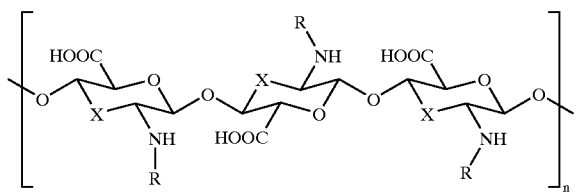

where X is selected from the group consisting of CO, C(H)OH, and mixtures thereof; R is selected from the group consisting of H, alkyl groups, acyl groups, and mixtures thereof, and n is an integer from 1 to 400,000.

"alkyl" refers to a fully saturated hydrocarbon moiety of from 1 to 7 carbons. The preferred alkyl moiety is methyl.

"acyl" refers to a moiety of the formula Ak—OC—, where Ak refers to an alkyl group. The preferred acyl group is $H_3C$—(O)C—.

Preferably, R is H, $H_3C$—(O)C—, or mixtures thereof. Having this formula, the polymers of the instant claimed invention can be synthesized from natural source materials, such as, chitin and chitosan. Chitin forms the exoskeletons of living organisms, such as, insects and crustaceans. It is an inexpensive natural source that is available commercially from Aldrich. Chitin comprises repeating mer units of the formula:

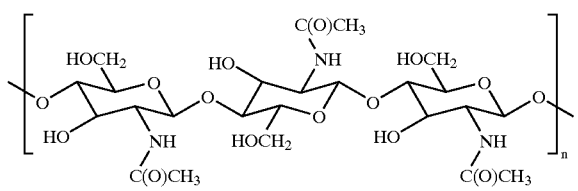

where n is an integer from 1 to 400,000.

Another source material for polymers of the instant claimed invention is chitosan. Chitosan is also available commercially from Aldrich. Chitosan may be synthesized by any suitable alkaline hydrolysis of chitin. Chitosan comprises repeating mer units of the formula:

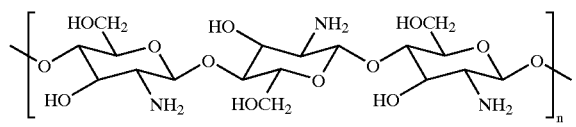

where n is an integer from 1 to 400,000.

The polymers of the instant claimed invention can be produced by oxidizing a base polymer. The base polymer is selected from the group consisting of chitin, chitosan, and other like material. The preferred base polymers are chitin and chitosan.

The base polymer is oxidized in a solution containing an oxidizing agent. Any suitable oxidizing agent can be used. These suitable oxidizing agents are known to people of ordinary skill in the art and can include, hypochlorite, hydrogen peroxide, ozone, $N_2O_4$, activated dimethyl sulfoxide, N-chlorosuccinimide, and other similar oxidizing agents. The preferred oxidizing agent is sodium hypochlorite.

The oxidation reaction of the present invention can also include a catalytic agent contained in the solution. The present invention is not limited to the type of catalytic agent and can include catalysts known in the art of oxidizing reactions. These catalysts, include, for example, stable radicals, particularly nitroxides such as, 2,6,6-tetramethyl-piperidine N-oxyl free radical ("TEMPO"), oxoammonium salts, charge transfer catalysts, such as, quaternary ammonium salts, and other like catalytic agents. The preferred catalyst is TEMPO.

It is preferred that the oxidizing reaction be conducted in the presence of a catalytic agent.

The oxidation reaction further includes maintaining a pH level ranging from about 10 to about 12. The pH level can be adjusted by utilizing any suitable acid and/or base, such as, NaOH and HCl.

The oxidation reactions of chitin and chitosan produce polymers from the class of polyacetamidouronic acids and polyaminouronic acids as previously discussed.

For example, the oxidation of chitin produces polymers from the class of polyacetamidouronic acids having repeating mer units of the formula:

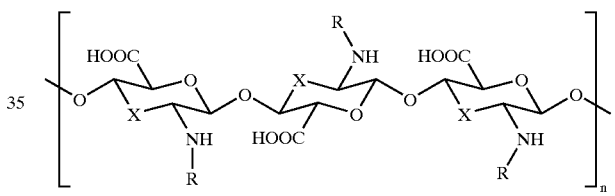

where X is selected from the group consisting of CO, C(H)OH, and mixtures thereof; and R is $H_3C$—(O)C—, and n is an integer from 1 to 400,000.

The oxidation of chitosan forms polymers comprising repeating mer units of the formula:

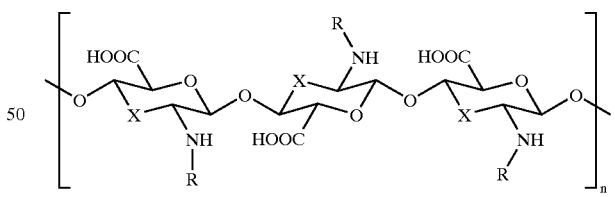

where X is selected from the group consisting of CO, C(H)OH, and mixtures thereof; R is H; and n is an integer from 1 to 400,000.

The oxidation of chitosan can also produce polymers containing polyacetamido groups, polyamino groups, and carboxyl groups depending on the purity of the chito san polymer. This is suggested because alkaline hydrolysis of chitin may not react to completion, thus, chitin may not completely hydrolyze into chitosan. Therefore, the chitin hydrolysized composition, i.e., chitosan, may contain both amine and amide groups. Accordingly, the oxidation of the chitosan can produce polymers that contain amine groups, amide groups, and carboxyl groups.

The present invention is not limited to polymers produced from chitin and chitosan. After oxidation of the chitin or chitosan, any suitable alkylation and/or acylation reaction can be used to provide polymers which include any suitable number and variety of acyl groups, alkyl groups, and mixtures thereof.

As previously discussed, the polymers of the instant claimed invention are desirably used to treat industrial water systems. Industrial water systems, include, but are not limited to, cooling tower water systems (including open recirculating, closed and once-through systems); petroleum wells, downhole formations, geothermal wells and other oil field applications; boilers and boiler water systems; mineral process waters including mineral washing, flotation and benefaction; paper mill digesters, washers, bleach plants and white water systems; black liquor evaporators in the pulp industry; gas scrubbers and air washers; continuous casting processes in the metallurgical industry; air conditioning and refrigeration systems; industrial and petroleum process water; indirect contact cooling and heating water, such as pasteurization water; water reclamation and purification systems; membrane filtration water systems; food processing streams (meat, vegetable, sugar beets, sugar cane, grain, poultry, fruit and soybean); and waste treatment systems as well as in clarifiers, liquid-solid applications, municipal sewage treatment and industrial or municipal water systems.

Preferably industrial water systems are those relating to the paper, food and medical industry. More preferably, the industrial water systems relate to pulp bleaching.

In the method of the instant claimed invention, the polymer compositions are added to the industrial water system in an amount of at least about 2 ppm, preferably at least about 5 ppm, and more preferably at least about 10 ppm. For purposes of this patent application, an upper limit of 1000 ppm of polymer is stated as being applicable, however, it must be understood that applying more than 1000 ppm of polymer is also going to be effective in terms of limiting scale. Therefore, the practical upper limit of the amount of polymer composition added to an industrial water system is limited only to the extent that practical considerations apply; for example, the cost associated with adding an increased amount of the polymer, the saturation point of the polymer, and other like considerations known to people of ordinary skill in the art.

The polymers of the instant claimed invention combine the functional properties of carboxyl groups and nitrogen-containing groups to effectively inhibit scale, particularly calcium oxalate and barium sulfate scale as detailed below.

The following examples are presented to describe preferred embodiments and utilities of the invention and are not meant to limit the invention unless otherwise stated in the claims appended hereto.

EXAMPLE 1

An example of the oxidation reactions of chitin and chitosan is provided below. In general, the oxidation reaction is based on modifications to known selective oxidation reactions of chitin and chitosan. The oxidation reactions of chitin or chitosan are preferably carried out as follows:

Two grams of chitin or chitosan were suspended in 100 ml of water containing 80 mg of TEMPO and 0.2 g of sodium bromide. An additional 30 mg of TEMPO and 1.8 g of sodium bromide were added after three hours and one hour, respectively. The suspension temperature was adjusted to 4° C. with an ice bath. In addition, the pH was adjusted to 10 with 0.1 N NaOH. 16 ml of 11% sodium hypochlorite ("NaClO") in an aqueous solution was added to the suspension wherein an additional 15 ml of the NaClO solution was added after 3 hours and an additional 15 ml more was added after 4 hours. The pH was maintained at a range of 10.2 to 10.8 by adding hydrochloric acid and, subsequently, 0.1 N NaOH.

The solution was then stirred for two days. The pH was adjusted to 6.1, and it was filtered through a paper filter. The solution was diluted to 300 ml and subjected to ultrafiltration to eliminate salts and low molecular weight admixtures by utilizing a #1 filter at 30 psi. After a 900 ml solution was eluted, the eluent did not contain any solute. The resulting 1–3% solution was placed in a refrigerator and used in the scale tests as described below.

The molecular weights ("MW") of the synthesized polymeric products were determined by gel permeation chromatography ("GPC") by utilizing (a) TSK PW columns from TosoHaas, namely, GMPW and 1000PW, with a nitrate-borate mobile phase buffered at pH 9 and (b) silica-based columns from MicraScientific and TosoHaas with a sulfate-phosphate mobile phase buffered at neutral pH.

Both methods gave similar distribution curves. The GPC elution profiles showed two polymeric peaks. A very high MW peak accounted for 3–5% of the total polymeric area. However, the MW of this peak was not quantified. The MW distribution data were calculated for the lower MW main peaks on the borate anionic system chromatograms. Two sets of data were obtained corresponding to (A) polyethylene glycol standards and (B) polysaccharide standards. With each standard, the weight average MW ("$M_W$") and number average MW ("$M_N$") were obtained. As indicated below, the $M_W$ and $M_N$ are in atomic mass units ("amu"). The MW results are provided in the following table:

| Sample | Standard | $M_W$ (amu) | $M_N$ (amu) | Polydispersity ($M_W/M_N$) |
|---|---|---|---|---|
| CH-1 | A | 9100 | 4000 | 2.3 |
|  | B | 16600 | 7250 | 2.3 |
| CZ-1 | A | 3100 | 2050 | 1.5 |
|  | B | 5200 | 2700 | 1.9 |
| CZ-2 | A | 3800 | 2750 | 1.4 |
|  | B | 6700 | 4230 | 1.6 |

The CH-1 sample was produced from the oxidation of chitin as described above and has the following formula or structure as previously discussed:

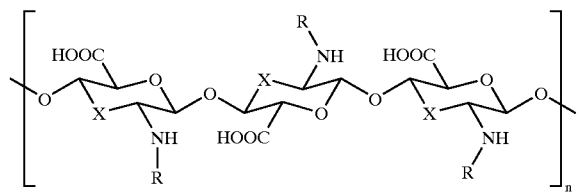

where X is selected from the group consisting of CO, C(H)OH, and mixtures thereof; and R is $H_3C—(O)C—$, and n is an integer from 1 to 400,000.

The CZ-1 and CZ-2 samples were produced from the oxidation of chitosan as described above and each have the following formula as previously discussed:

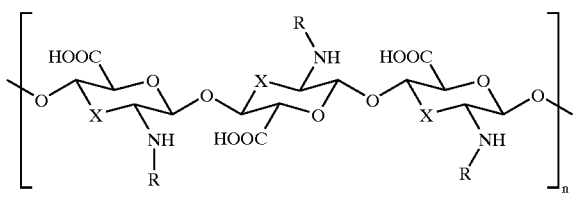

where X is selected from the group consisting of CO, C(H)OH, and mixtures thereof; R is H and n is an integer from 1 to 400,000.

The only essential difference between CZ-1 and CZ-2 is the molecular weight of each of the samples, namely, CZ-1 is a lower molecular weight polymer than CZ-2. The CH-1, CZ-1, and CZ-2 samples were further characterized utilizing nuclear magnetic resonance ("NMR") techniques as detailed below.

None of the oxidized samples eluted from an organic gel-based TSK PW column with an acetate-sulfate mobile phase at pH 3. This indicates that the oxidation reaction was successful since neutral and cationic polymers generally chromatograph well on this system. Oxidation was accompanied by partial depolymerization.

The differences in MW of the three samples reflect the differences in the degree of polymerization of the starting materials, namely, chitin and chitosan. The high inhibiting activities of all three samples as demonstrated below suggests that changes in the degree of polymerization in a relatively broad range are not critical to the polymer's performance. Considering the degree of polymerization of the original natural products that exceed those found in the oxidation products by an order of magnitude, depolymerization during the preparation procedure is very significant.

Carbon NMR ($^{13}C$ NMR) spectra, of the polymers in deuterium oxide demonstrated characteristic signals of the carbohydrate backbone (groups at 56, 70–85, and 102 ppm), residual acetate groups (23 ppm), and a group of intensive signals at 172–178 ppm corresponding to carbonyl and carboxyl groups resulted from the oxidation of methylol groups in the original polymeric carbohydrate. The procedure of TEMPO-mediated oxidation as described above is generally known to be a regioselective process which leads to oxidation of the exocyclic methylol group (one $CH_2OH$ to C=O transformation per unit). The products of the oxidation process yielded higher oxidized products in all three cases.

Based on the NMR spectra, at least three distinct types of carbonyl groups formed in CH-1, CZ-1 and CZ-2, exceeding six in number. The number of carboxyl groups introduced per unit can be estimated at approximately two, based on the intensities of the signals.

Altogether, the presented experimental data indicate that the products of chitin and chitosan oxidation result from a selective oxidation and partial depolymerization of chitin and chitosan. The selective oxidation procedure as previously described is less selective than known selective oxidation procedures which indicates that the products of the above described procedure are different products than those products produced by known TEMPO-mediated oxidation of polyuronic acids from cellulose and chitin.

EXAMPLES 2–5

A series of laboratory tests were conducted on the polymer products, namely, CH-1, CZ-1, and CZ-2, to demonstrate the scale inhibiting effectiveness due to the combined functionalities of the nitrogen-containing groups and carboxyl groups of these products. To show the effectiveness, the polymers were added to model solutions, that is, laboratory prepared test solutions containing scale. The polymers were also added to a mill water sample containing scale as detailed below.

Tests were performed on calcium oxalate scale in model solutions by employing a scale rate monitor ("SRM") and standard chemical tests which results are shown below in Tables 1 and 2, respectively. Tests were also performed on barium sulfate in model solutions employing standard chemical tests which results are shown below in Table 3. Barium sulfate scale inhibiting tests were also performed on mill water samples which contained a significant amount of sulfate ions. The mill water sample results are shown below in Table 4. The test procedures relating to each of Tables 1–4 are described below as Examples 2–5, respectively.

EXAMPLE 2

A 1 ml (128 ppm) test solution of calcium oxalate was prepared by separately dissolving sodium oxalate (0.268 g) and calcium chloride dihydrate (0.294 g) each in 35 ml 0.1 N HCl. The solutions were diluted to 100 ml each with deionized water, mixed under intense stirring, and the mixed solution was diluted to the 2 liter volume with deionized water with 0.1 N HCl added as needed to adjust the pH to 2.6. This solution was the control sample as indicated in Table 1 (see below). The test solutions were prepared by adding an amount of a polymeric product to the control solution resulting in a concentration of 10 ppm. Test solutions were made for each of the polymeric products, namely, CZ-0, CH-1 and CZ-1. CZ-0 is a low molecular-weight chitosan from Aldrich. In addition, a test solution containing carboxymethylcellulose 12 M8 ("CMC") at 40 ppm was made for a comparative analysis. CMC is commercially available. A 700 ml sample of each of the control and test solutions were analyzed by a Nalco SRM.

The Nalco SRM is designed to be used for testing the tendency of aqueous solutions to form deposits (scale), which solubility in water is pH-dependent. The measuring unit of the instrument is a metal-plated quartz crystal microbalance ("QCM") that vibrates at a certain frequency dependent on the mass of the crystal. The electric current applied to the metal surface generates a local increase in the pH due to the reduction of oxygen and water that yields OH anions near the cathode. This increase stresses the system, and the deposit gradually forms on the surface of the QCM. As a result of the change of the mass, the vibration frequency gradually changes. The instrument registers these changes thus allowing simultaneous monitoring of both of the accumulation and the rate of accumulation of the deposit. The SRM can be applied to any type of scale which solubility is pH-dependent (i.e., calcium oxalate, calcium carbonate, calcium salts of organic acids). The conditions of the experiment (bulk pH, salt concentrations, and applied current or potential) should allow for full solubility of the target salt in the bulk solution and a significant decrease in the solubility at the surface pH generated by the applied current.

EXAMPLE 3

Stock solutions of calcium chloride (as dihydrate), sodium oxalate, hydrochloric acid and solutions containing the polymer compositions, namely, CH-1, CZ-1, CZ-2, and CZ-0, were separately prepared, each at pH 4. Sample solutions of sodium oxalate (1 mM, 20 ml, three batches of six samples each) with an amount of polymer composition (indicated as CH-1, CZ-1, CZ-2, and CZ-0 in Table 2) or without an amount of polymer composition (Blank or Control sample) were prepared at room temperature with stirring. Next, 20 ml of a 1 mM solution of calcium chloride was added to each sample under stirring in 5 minutes. The flasks were sealed with Parafilm and continuously stirred at room temperature for two hours. The samples were then filtered through 0.45 μm filters (Gelman Acrodisc 13 CR PTFE, 10 ml disposable syringes used), and the filtrates acidified with concentrated hydrochloric acid (two drops in each 10 ml samples, pH 1).

The acidified filtrates were analyzed for calcium ions by Atomic Adsorption ("AA"). The AA spectrometer was calibrated with solutions of calcium chloride.

The percent inhibition ("% I") of each of the sample solutions was determined by the expression:

$$\% \ I = 100 \cdot ([Test] - [Control])/([Initial] - [Control]),$$

where

[Test] is the $Ca^{+2}$ concentration in the non-Blank samples

[Control] is the Blank sample (without a polymer), and

[Initial] is in the sample of calcium chloride proper, as measured by atomic absorption (ppm as calcium chloride).

EXAMPLE 4

The procedure is similar to the method described in Canadian Patent No. 1,326,430. However, it was modified to provide more consistency and similarity to the procedure used with calcium oxalate as previously discussed. Equimolar concentrations of barium chloride and sodium sulfate were applied in this test to raise the solubility of barium sulfate in the control sample compared to very low concentrations observed when a significant excess of the sulfate ion is applied close to the accuracy limits of Inductively Coupled Plasma Spectrometry ("ICP"). Stock solutions of barium chloride, sodium sulfate, hydrochloric acid and solutions containing polymer compositions, namely, CH-1, CZ-1, CZ-2, and CZ-0, were separately prepared, each at pH 2.5.

Sample solutions of sodium sulfate (1 mM, 20 ml, in duplicates) with an amount of polymer composition (indicated as CH-1, CZ-1, CZ-2, and CZ-0 in Table 3) or without a polymer composition (Blank or Control sample) were prepared and heated to 60° C. with stirring (by Teflon-coated magnetic bars). In addition, a sample solution containing sodium hexametaphosphate was prepared for a comparative analysis. Sodium hexametaphosphate is commercially available from Aldrich. Next, 20 ml of 1 mM solution of barium chloride was added to each sample under stirring in five minutes. The flasks were sealed with Parafilm and kept at 58–62° C. for one hour. After cooling to room temperature in twenty minutes the samples were filtered through 0.45 μm filters (Gelman Acrodisc 13 CR PTFE, 10 ml disposable syringes). The filtrates were analyzed for barium ions by ICP.

The percent inhibition (% I) was determined by the expression:

$$\% \ I = 100 \cdot ([Test] - [Control])/([Initial] - [Control]),$$

where

[Test] is the $Ba^{+2}$ concentration in the non-Blank samples,

[Control] is the Blank sample (without a polymer) and

[Initial] is the sample of barium chloride proper, as measured by ICP (ppm).

EXAMPLE 5

Mill water from hardwood kraft pulp (Alabama River Pulp Mill) was acidified to pH 2.5. A 3.5% sodium sulfate solution was added so that the concentration of added sulfate was 0.5 mM. An amount of a polymer composition, namely, CH-1 and CZ-1 was added to a concentration of 10 ppm. The samples (20 ml, in duplicates) with CH-1 and CZ-1 (indicated as CH-1 and CZ-1 in Table 4) or without a polymer (Blank or Control sample) were heated to 60° C. with stirring (by Teflon-coated magnetic bars). In addition, a sample solution containing sodium hexametaphosphate was prepared for a comparative analysis. Sodium hexametaphosphate is commercially available.

Next, 5 ml of 0.061% solution of barium chloride was added to each sample under stirring in five minutes so that the concentration of added barium chloride was 0.5 mM. The flasks were sealed with Parafilm and kept at 58–62° C. for one hour. After cooling to room temperature in twenty minutes the samples were filtered through 0.45 μm filters (Gelman Acrodisc 13 CR PTFE, 10 ml disposable syringes). The filtrates were analyzed for barium ions by ICP.

The percent inhibition (% I) was determined by the expression:

$$\% \ I = 100 \cdot ([Test] - [Control])/([Initial] - [Control]),$$

where

[Test] is the $Ba^{+2}$ concentration in the non-Blank samples,

[Control] is the Blank sample (without a polymer) and

[Initial] is the sample of barium chloride proper, as measured by ICP (ppm).

TEST RESULTS

The test procedures of the above-described examples were conducted to demonstrate the desirable and advantageous scale inhibiting effect of a polymer containing both nitrogen groups and carboxyl groups. The combined functionalities of these groups are particularly effective for inhibiting aqueous solutions, such, as pulp bleach plant solutions, containing calcium oxalate and barium sulfate scale as further shown in Tables 1–4.

Table 1. Mass accumulation (μg/cm$^2$) and rate of mass accumulation (mg/h.cm$^2$) of calcium oxalate on the surface of a metal-plated quartz crystal microbalance from a 1 mM solution of calcium oxalate (bulk pH 2.6, surface pH 4–6). Each polymer was present in the solution at a concentration of about 10 ppm.

| Time (min) | Control* (μg/cm²) | Control* (mg/h •cm²) | CMC* (μg/cm²) | CMC* (mg/h •cm²) | CZ-0* (μg/cm²) | CZ-0* (mg/h •cm²) | CH-1 (μg/cm²) | CH-1 (mg/h •cm²) | CZ-1 (μg/cm²) | CZ-1 (mg/h •cm²) |
|---|---|---|---|---|---|---|---|---|---|---|
| 10 | 8.42 | 0.148 | 11.28 | 0.137 | 21.82 | 0.168 | 1.04 | 0.076 | 1.02 | 0.03 |
| 20 | 38.31 | 0.254 | 24.49 | 0.112 | 45.90 | 0.208 | 0.98 | 0.030 | 1.02 | 0.03 |
| 30 | 83.62 | 0.335 | 37.96 | 0.127 | 72.51 | 0.214 | 0.76 | 0.050 | 2.25 | 0.07 |
| 40 | 147.09 | 0.399 | 51.64 | 0.105 | 106.43 | 0.249 | 0.82 | 0.099 | 6.98 | 0.08 |
| 50 | 216.07 | 0.445 | 65.11 | 0.124 | 144.33 | 0.231 | 2.40 | 0.044 | 12.84 | 0.09 |
| 60 | 285.60 | 0.428 | 78.75 | 0.122 | 181.60 | 0.258 | 3.84 | 0.073 | 23.39 | 0.09 |

*Comparative Example, Not an Example of this invention.

TABLE 2

% I of calcium oxalate deposition from 0.5 mM model solutions.

| Inhibitor | Concentration (ppm) | % I (ppm/ppm) |
|---|---|---|
| CH-1 | 10 | 44.2 |
| CZ-1 | 10 | 40.3 |
| CZ-2 | 10 | 42.4 |
| CZ-0* | 10 | 3.8 |

*Comparative Example, Not an Example of this invention.

TABLE 3

% I of barium sulfate deposition from 0.5 mM model solutions.

| Inhibitor | Concentration (ppm) | % I (ppm/ppm) |
|---|---|---|
| CH-1 | 10 | 62.6 |
| CH-1 | 5 | 51.7 |
| CZ-1 | 10 | 88.3 |
| CZ-1 | 5 | 78.2 |
| CZ-2 | 10 | 99.8 |
| CZ-2 | 5 | 43.1 |
| CZ-0* | 10 | 0 |
| Sodium hexametaphosphate* | 10 | 80.5 |

*Comparative Example, Not an Example of this invention.

TABLE 4

| Inhibitor | Concentration (ppm) | % I (ppm/ppm) |
|---|---|---|
| CH-1 | 10 | 11.1 |
| CZ-1 | 10 | 22.6 |
| Sodium hexametaphosphate* | 10 | 6.8 |

*Comparative Example, Not an Example of this invention.

As indicated in Tables 1–4, the test samples, namely, CH-1, CZ-1, and CZ-2, which included an amount of carbohydrate polymer having both of the nitrogen-containing groups and carboxyl groups effectively inhibited calcium oxalate and barium sulfate scale as compared to the other samples, such as, CZ-0, CMC, and sodium hexametaphosphate which did not include both of the nitrogen-containing groups and carboxyl groups.

As indicated in Table 1, the mere introduction of carboxyl groups to a carbohydrate chain, i.e., CMC, exhibits a markedly less scale-inhibiting activity as compared to CH-1 and CZ-1, namely, carbohydrates containing both carboxyl groups and nitrogen-containing groups as previously discussed.

As indicated in Table 2, CH-1, CZ-1 and CZ-2 outperformed CZ-0 to inhibit calcium oxalate scale in the model solution.

As further indicated in Table 3 and Table 4, sodium hexametaphosphate demonstrates a markedly less scale-inhibiting activity as compared to carbohydrates containing both carboxyl groups and nitrogen-containing groups, namely, CH-1, CZ-1 and CZ-2.

Accordingly, the test results demonstrate the effectiveness of the new and improved scale inhibitors of the present invention. The polymer compositions of the present invention do not contain phosphorous and, thus, desirably provide a non-phosphorous alternative to scale inhibition, particularly scale derived from calcium oxalate and barium sulfate. Because the polymer compositions of the present invention can originate from natural sources, such as, chitin and chitosan, the polymer compositions are not expected to display any toxicity or adverse environmental effects.

It should be appreciated that the lesser measured inhibition of scale in mill water (Table 4) as compared to the model solution (Table 3) does not indicate poor performance. Mill water contains an excess of sulfate ions and also "natural" scale inhibitors. Therefore, the dosage required to achieve a significant effect in mill water is different from the dosage in a model solution.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that all such changes and modifications be covered by the intended claims.

What is claimed is:

1. A polymer comprising repeating mer units of the formula:

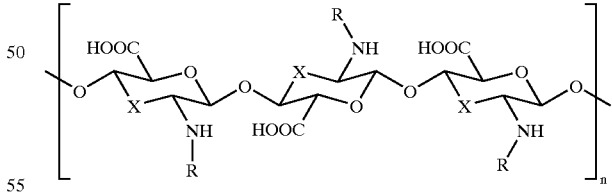

where X is selected from the group consisting of CO, C(H)OH, and mixtures thereof, R is selected from the group consisting of H, alkyl groups, acyl groups, and mixtures thereof, and n is an integer from 1 to 400,000.

2. The polymer of claim 1 wherein R is H, $CH_3CO$ or mixtures thereof.

3. The polymer of claim 1 wherein R is H.

4. The polymer of claim 1 wherein R is $CH_3CO$.

5. The polymer of claim 1 wherein the polymer is selected from the group consisting of a polyaminouronic acid, a polyacetamidouronic acid, and mixtures thereof.

6. A method of producing a polymer, the method comprising the steps of:
   providing a base polymer;
   oxidizing the base polymer in a solution containing an oxidizing agent; and
   recovering a polymer comprising repeating mer units of the formula:

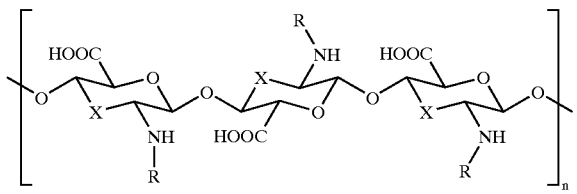

where X is selected from the group consisting of CO, C(H)OH, and mixtures thereof: R is selected from the group consisting of H, alkyl groups, acyl groups, and mixtures thereof, and n is an integer from 1 to 400,000.

7. The method of claim 6 wherein said base polymer is selected from the group consisting of chitin and chitosan.

8. The method of claim 6 wherein said base polymer has a formula:

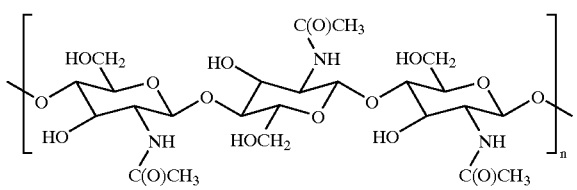

where n is an integer from 1 to 400,000.

9. The method of claim 6 wherein said base polymer has a formula:

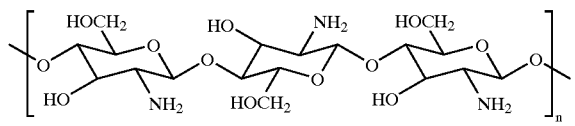

where n is an integer from 1 to 400,000.

10. The method of claim 6 wherein the oxidizing agent is selected from the group consisting of hypochlorite, hydrogen peroxide, ozone, $N_2O_4$, activated dimethyl sulfoxide, and N-chlorosuccinimide.

11. The method of claim 6 wherein said solution containing an oxidizing agent further comprises a catalytic agent.

12. The method of claim 6 further comprising the step of maintaining a pH level ranging from about 10 to about 12 during said oxidizing.

13. A method for inhibiting scale derived from an industrial water system containing an amount of scale, the method comprising the steps of:

providing a polymer comprising repeating mer units of the formula:

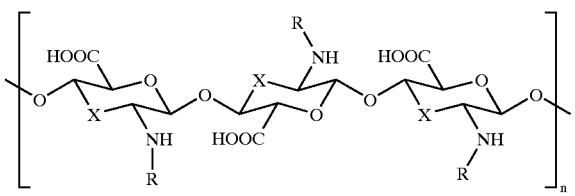

where X is selected from the group consisting of CO, C(H)OH, and mixtures thereof; and R is selected from the group consisting of H, alkyl groups, acyl groups, and mixtures thereof; and n is an integer from 1 to 400,000; and adding an effective amount of said polymer to the industrial water system.

14. The method of claim 13 wherein R is H, $CH_3CO$, or mixtures thereof.

15. The method of claim 14 wherein R is H.

16. The method of claim 14 wherein R is $CH_3CO$.

17. The method of claim 13 wherein said effective amount of polymer is at least about 2 ppm.

18. The method of claim 13 wherein said effective amount of polymer is at least about 5 ppm.

19. The method of claim 13 wherein said effective amount of polymer is at least about 10 ppm.

20. The method of claim 13 wherein the scale is calcium oxalate, barium sulfate, or mixtures thereof.

* * * * *